United States Patent
Garney

(10) Patent No.: US 7,260,672 B2
(45) Date of Patent: Aug. 21, 2007

(54) USING DATA STORED IN A DESTRUCTIVE-READ MEMORY

(75) Inventor: John Garney, Portland, OR (US)

(73) Assignee: Intel Corporation, Santa Clara, CA (US)

(*) Notice: Subject to any disclaimer, the term of this patent is extended or adjusted under 35 U.S.C. 154(b) by 148 days.

(21) Appl. No.: 09/948,462

(22) Filed: Sep. 7, 2001

(65) Prior Publication Data

US 2003/0051148 A1 Mar. 13, 2003

(51) Int. Cl.
G06F 12/00 (2006.01)

(52) U.S. Cl. .................. 711/107; 705/51; 705/57; 713/193

(58) Field of Classification Search ........ 711/104–107, 711/163
See application file for complete search history.

(56) References Cited

U.S. PATENT DOCUMENTS 6,178,479 B1 1/2001 Vishin

FOREIGN PATENT DOCUMENTS

GB 2 305 339 A 4/1997

OTHER PUBLICATIONS

Microsoft Computer Dictionary, 4th Edition, Microsoft Press, 1999, pp. 36 and 464.*

* cited by examiner

*Primary Examiner*—Hyung Sough
*Assistant Examiner*—Kaushik Patel
(74) *Attorney, Agent, or Firm*—Blakely, Sokoloff, Taylor & Zafman LLP

(57) ABSTRACT

A destructive-read memory is one that the process of reading the memory causes the contents of the memory to be destroyed. Such a memory may be used in devices that are intended to acquire data that may have associated usage restrictions, such as an expiration date, usage count limit, or data access fee for the acquired data. Typically, to enforce usage restrictions, and protect against theft, complex and often costly security techniques are applied to acquired data. With destructive-read memory, complex and costly security is not required for stored data. In one embodiment, a write-back mechanism, which may employ security, is responsible for enforcing usage restrictions. If the write-back mechanism determines continued access to acquired data is allowed, then it writes back the data as it is destructively read from the memory.

22 Claims, 4 Drawing Sheets

USING DATA STORED IN A DESTRUCTIVE-READ MEMORY

FIELD OF THE INVENTION

The invention generally relates to distributing commercial products, and more particularly to using destructive-read memory to provide limited access to distributed commercial products without having to employ cumbersome protective technology to prevent unwanted access to distributed commercial products.

BACKGROUND

Recently there have been many advances in community file sharing technology, and in technology required for digitally encoding music data, audio and/or visual data. These advances allow people (or machines) to easily share and exchange such data, either directly or indirectly though sharing services. Such sharing technology can be used to aid proliferation of commercial and non-commercial data, such as music. A significant issue hindering such proliferation, is difficulty in enforcing copyrights and/or sharing policies for certain data.

For example, one may desire to "rent" a song, or a movie, by allowing one to download the song or movie, such that it can only be played a certain number of times, or only for a given time period. To effect such restraints, costly and complex security techniques are typically employed to control digital data distribution. Such security techniques increase the costs of providing data to consumers, increase costs for devices to present the data, and provide more opportunity for problems to occur.

BRIEF DESCRIPTION OF THE DRAWINGS

The features and advantages of the present invention will become apparent from the following detailed description of the present invention in which.

DETAILED DESCRIPTION

To overcome limitations in the prior art, and specifically, to remove need for complex security measures for protecting distributed data, a destructive-read memory is utilized to store data. As used herein, the term "data" is intended to include any type of data that can be stored in a memory, for example, music, audio, video, computer software, digital images, etc., as well as instructions to program or configure a Field Programmable Gate Array, Digital Signal Processor, or the like. When data in the destructive-read memory is accessed, the accessed memory is automatically erased by the act of reading.

One example of a destructive read memory is magnetic core memory developed at the Massachusetts Institute of Technology (MIT) by Jay Forrester in the 1950s. In magnetic core memory, a binary bit (one/zero) was stored as a magnetic field in a very small ring of ferrous material. In order to read the state of a bit in a ring, the magnetic field is changed to a known state and consequently the stored magnetic field of the ring is lost. The value of the bit read (one/zero) was determined by monitoring the change in the magnetic field during the change to a known state, i.e. during the read operation.

Due to limited capacity, difficulty of use, and high cost, back in the 1950s, magnetic core memory was used sparingly. However, recent advances in storage technologies have created large capacity storage mediums with destructive-read features that can be used to the advantage of the invention. Once data is securely acquired and simply stored in such a memory, it can be easily read without complex protection schemes, since the act of reading destroys the data read.

This destructive-read feature removes the necessity for complex protection schemes for stored data, which in turn reduces the cost and complexity required to provide data, and the cost of manufacturing devices to present stored data. Rather than a manufacturer, distributor, etc. having to focus on securely encoding data to prevent unauthorized usage, which entails use of complex encryption schemes, complex key management to control data access, compliance with government encryption export regulations, etc., instead focus may be directed towards protecting the mechanism used for writing read data back into the destructive read memory. This write back protection is independent of the data being stored in the memory, and secures stored data irrespective of whether stored data is otherwise encoded.

Figure 1:
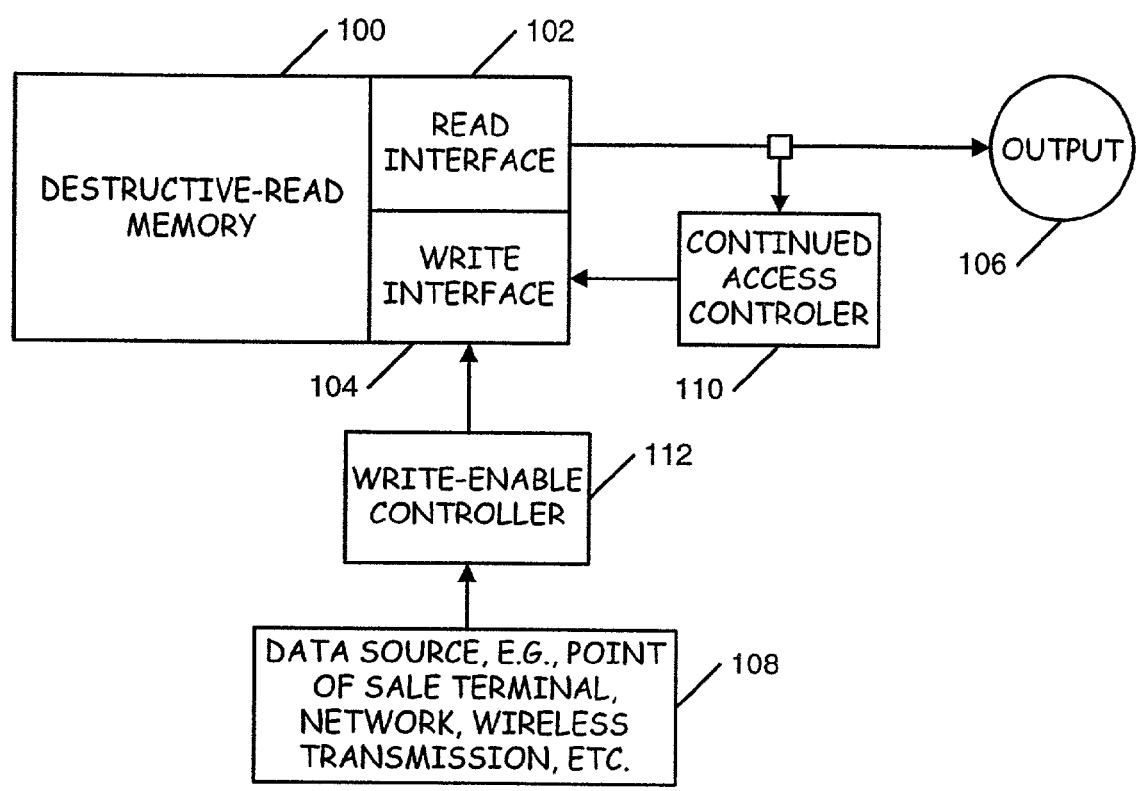
FIG. 1 illustrates, according to one embodiment, a destructive-read memory and associated control logic for reading from the memory and writing back to the memory.

FIG. 1 illustrates, according to one embodiment, a destructive-read memory 100 and associated control logic for reading 102 from the memory and writing 104 back to the memory. The FIG. 1 embodiment may be incorporated into a personal digital device, such as a personal digital assistant, portable music or video playback device, into consumer electronics such as those installed within a home or office, or other machines.

It is assumed that the memory is physically configured such that the act of reading a portion of the destructive-read memory destroys the contents of the read memory portion. However, it will be appreciated that other memory constructs may be used instead, such as conventional Random Access Memory (RAM) such as Dynamic RAM (DRAM), Synchronous DRAM (SDRAM), etc., where incorporated into the memory package, or an associated memory controller, is logic that automatically erases the contents of the memory after it is accessed.

As illustrated, the read interface 102 is used to retrieve some or all of the contents of the destructive-read memory 100. Read data may be provided to an external output 106, such as a physical data output on a hardware device, e.g., headphone output, video output, network output, etc. Output 106 may also be an internal output, such as on a circuit board or integrated circuit, where the output is provided as input to other control logic or data bus. It will be appreciated that the read interface may be configured to operate and be accessed in a variety of ways depending on the environment in which the destructive-read memory is implemented.

The write interface 104 is used to write data into the destructive-read memory. This interface may be used to initialize the memory with data from some data source 108, such as a point of sale terminal, network, wireless transmission, etc., or it may be used to rewrite the read memory with the read data. In this latter example, the output of the read interface 102 is communicatively coupled with a "continued access controller" 110, which in turn is communicatively coupled to the write interface 104. The continued access controller is responsible for enforcing access rights associated with data stored in the destructive-read memory 100.

In one embodiment, destructive-read memory may initialized (written) from a data source 108, where the write-enable 112 first uses some traditional authentication process to validate write-enabling the memory, and then allows a single (or large) bulk writing of data to the memory. For example, a device can be initialized for initial use by loading a series of purchased audio and/or visual works or other data into the destructive-read memory. Once the memory is write-enabled, data can be loaded into the memory without requiring any encryption of the stored data.

For simplicity, it is assumed the destructive-read memory stores data whose access is controlled by a single associated access rights, however it will be appreciated that the destructive-read memory may store multiple data items, each having their own access terms. For example, the destructive-read memory may store multiple songs, some distributed freely, and others having restricted access rights enforced by the continued access controller 110.

When data is accessed in the destructive-read memory, the contents of the memory is destroyed. However, incident to reading the memory, the continued access controller 110 may determine that access to the stored data should be continued. In this situation, the continued access controller may write the read data back to the destructive-read memory by way of the write interface 104.

Figure 2:
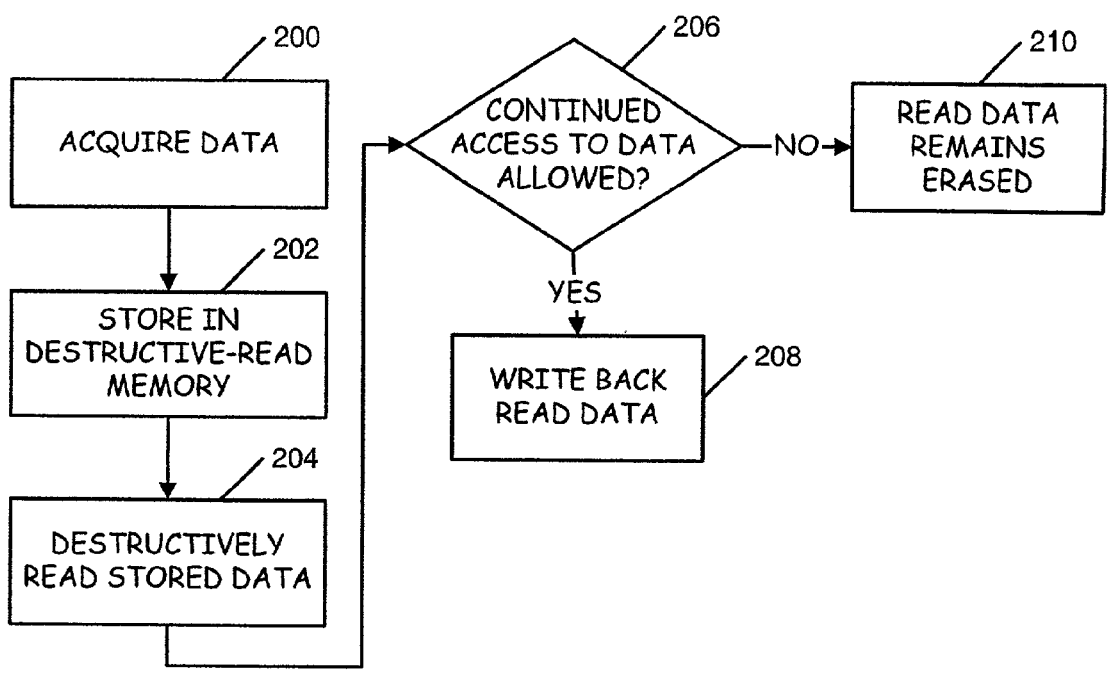
FIG. 2 illustrates, according to one embodiment, determining whether continued access to data read from a destructive-read memory should be permitted.

FIG. 2 illustrates, according to one embodiment, determining whether continued access to data read from a destructive-read memory should be permitted. In this embodiment, data is acquired 200 for the destructive read memory, such as through a purchase transaction at a store, by way of file sharing between individuals and/or machines, or other source.

The acquired data is stored 202 in the destructive-read memory. When the destructive-read memory is read 204, such as by way of a user or controller of a device incorporating the destructive-read memory, a test 206 is performed to determine whether access to the read data may continue. For example, a song may have been rented and stored in the memory, where the song is only allowed to be played once. In this scenario, a usage counter (not illustrated) is associated with the song and set to one. When the song is played, the counter may be decremented to zero, indicating that continued usage is not allowed, thus continued access is denied and the read data is allowed to remain erased 210 as a by product of having played the song.

Conversely, if the test 206 indicates that access may continue, then the read data is written back 208 into the destructive-read memory. For example, one may have rented a video good for five days playback. In this scenario, a time controller (not illustrated) may be associated with the data within the destructive-read memory, where the test 206 validates continued access (e.g., playback days remaining) against the time controller. It will be appreciated that a device incorporating the destructive-read memory, or the destructive-read memory itself, may provide a variety of control functions or interfaces that may be associated with stored data to regulate access and continued access to stored data. Alternatively, program code, extensible Markup Language (XML) code, or the like, may be associated so as to allow arbitrary tests and operations to control access and continued access to stored data.

In one embodiment, the testing 206 mechanism is protected, such as through encryption, in order to prevent attempts to illicitly modify access continuation rights for data stored in the destructive-read memory.

Figure 3:
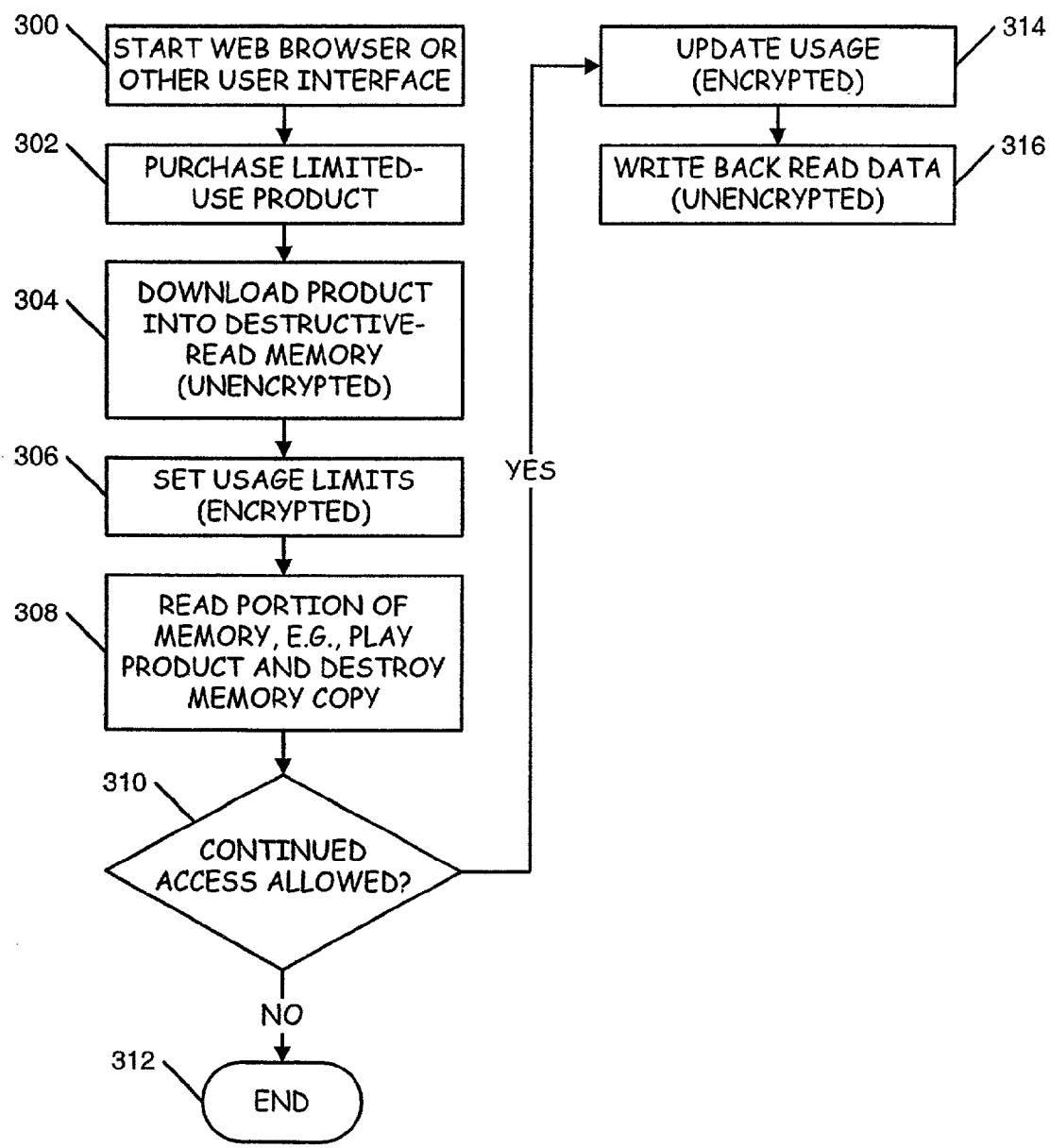
FIG. 3 illustrates, according to one embodiment, a user utilizing a web browser to purchase or acquire data for use in conjunction with a destructive-read memory.

FIG. 3 illustrates, according to one embodiment, a user utilizing a web browser to purchase or acquire data, such as from an online store, for use in conjunction with a destructive-read memory. The user starts 300 a web browser of a computer, or uses another user interface, such as a purchase tablet, wireless portable computer, personal digital assistant, or the like that is configured to obtain data for the user.

Assuming the user is seeking to purchase and download data, the user completes a purchase transaction 302. In the illustrated example, the user purchases a limited-used product, e.g., one that can be only used a certain number of times, or within a certain date, or according to some other restriction, such as a policy. The product's data is downloaded 304 to a destructive-read memory, such as one incorporated into a portable access device of the user, e.g., a music player, video player, etc. In one embodiment, downloaded data has an associated description, where the description includes data to facilitate determining compliance with a restriction such as one in a policy. In the illustrated embodiment, due to the inherently safe nature of the destructive-read memory, the data is stored in an unencrypted format.

If the user is using an interface to access the data that is different from the machine on which the data is to be accessed, it is assumed a wired or wireless communication path exists to transfer acquired data to the user's device for accessing the data, e.g., Bluetooth (promulgated by Ericsson, IBM, Intel, and others), infrared, or other communication techniques. Depending on the user interface, and the transfer distance, various communication techniques are employed.

Usage limits are then set 306 for the downloaded data to prevent tampering. These limits determine the operation of the continued access controller 110 (FIG. 1). In one embodiment, the restrictions are programming language code that is executed or interpreted by the continued access controller. It will be appreciated that various methods may be employed to transfer the usage restrictions along with the data, including embedding the restrictions within the downloaded data, wrapping the data and restrictions into a logical document, e.g., with XML, or through some method.

The user then accesses 308 the data, causing the stored data to be destroyed. A test 310 is performed to determine whether continued access to the data is allowed. As discussed above, the test may comprise specific testing code associated with the downloaded data, or a certain test already supported by the accessing device incorporating the destructive-read memory, e.g., accessing device may be required to provide support for certain common tests, such as for usage count limits or time limits. If 310 continued access is not allowed, then processing stops 312 with the destructive-read memory in the state of the data having been erased.

However, if 310 continued access is allowed, the usage data is updated 314 to reflect the current usage and the read data is written back to the memory 316. Thus, for example, if the restrictions include a usage limit, then the present access is counted against the restriction. When the last allowed access occurs, then the test 310 would fail and processing would stop 312 with the destructive-read memory being erased. In the illustrated embodiment, once testing 310 temporarily write-enables a device employing destructive-read memory, the data is written back 316 without encryption. In such fashion, a data provider may initially encrypt data to protect against illicit acts, and then have the protection automatically removed from the data during an initial read and write-back process. This embodiment allows, for example, a data provider to utilize a data encryption scheme that operates only once to uniquely distribute purchased data to a purchaser.

Figure 4:
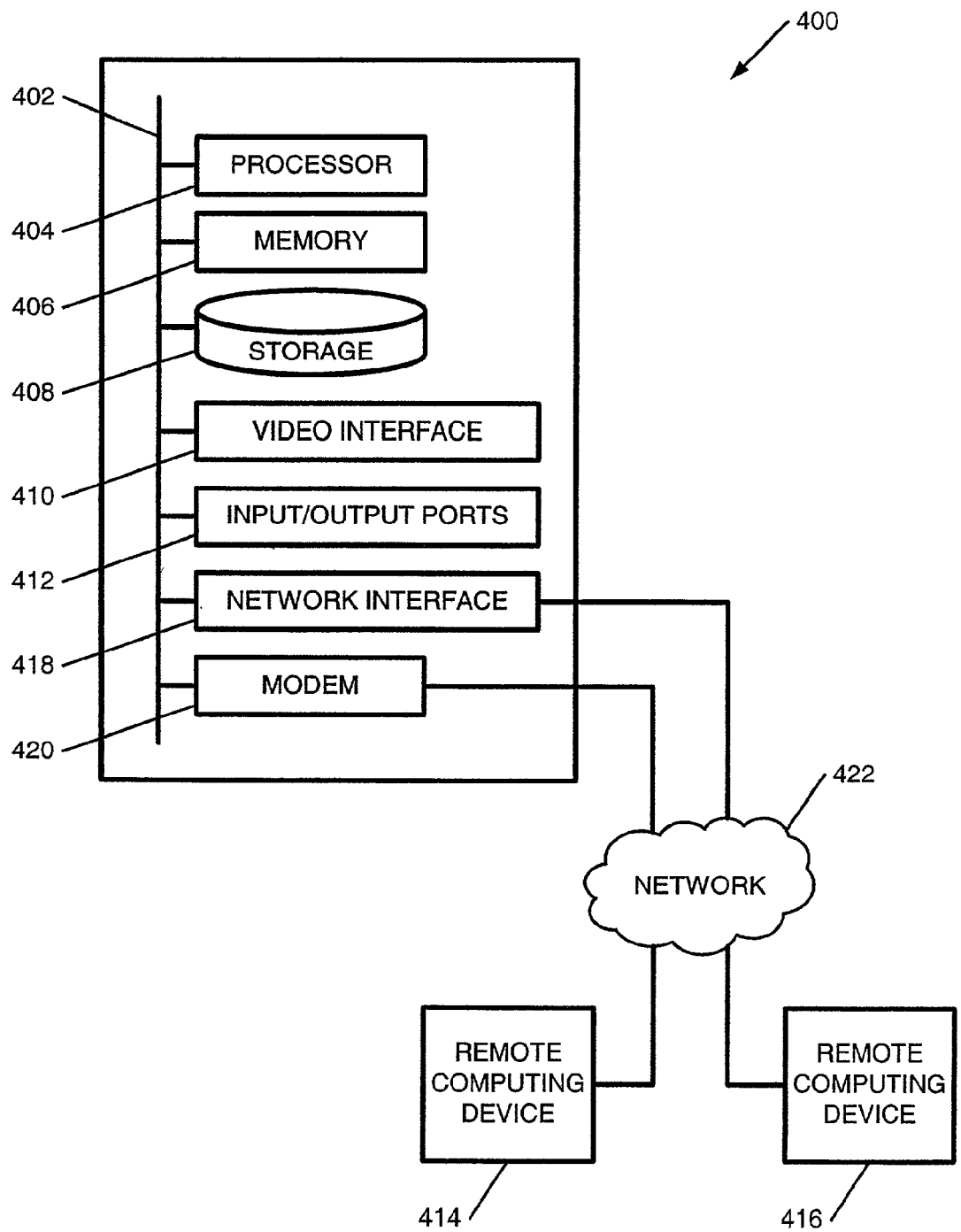
FIG. 4 illustrates a suitable computing environment in which certain aspects of the invention may be implemented.

FIG. 4 and the following discussion are intended to provide a brief, general description of a suitable computing environment in which certain aspects of the illustrated invention may be implemented. An exemplary system for embodying, for example, the destructive-read memory of FIG. 1, includes a machine 400 having system bus 402 for coupling various machine components. Typically, attached to the bus are processors 404, a memory 406 (e.g., RAM, ROM), storage devices 408, a video interface 410, and input/output interface ports 412.

The system may also include embedded controllers, such as Generic or Programmable Logic Devices or Arrays (PLD, PLA, GAL, PAL), Field-Programmable Gate Arrays (FPGA), Application Specific Integrated Circuits (ASIC), single-chip computers, smart cards, or the like, and the system is expected to operate in a networked environment using physical and/or logical connections to one or more remote systems 414, 416 through a network interface 418, modem 420, or other pathway. Systems may be interconnected by way of a wired or wireless network 422, including an intranet, the Internet, local area networks, wide area networks, cellular, cable, laser, satellite, microwave, "Bluetooth" type networks, optical, infrared, or other carrier.

The invention may be described by reference to program modules for performing tasks or implementing abstract data types, e.g., procedures, functions, data structures, application programs, etc., that may be stored in memory 406 and/or storage devices 408 and associated storage media, e.g., hard-drives, floppy-disks, optical storage, magnetic cassettes, tapes, flash memory cards, memory sticks, digital video disks, biological storage, as well as transmission environments such as network 422 over which program modules may be delivered in the form of packets, serial data, parallel data, propagated signals, or other transmission format.

Illustrated methods and corresponding written descriptions are intended to illustrate machine-accessible media storing directives, or the like, which may be incorporated into single and multi-processor machines, portable computers, such as handheld devices including Personal Digital Assistants (PDAs), cellular telephones, etc. An artisan will recognize that program modules may be high-level programming language constructs, or low-level hardware instructions and/or contexts, that may be utilized in a compressed or encrypted format, and may be used in a distributed network environment and stored in local and/or remote memory.

Thus, for example, with respect to the illustrated embodiments, assuming machine 400 operates an audio and/or visual playback device incorporating a destructive-read memory, then remote device 414 may be a server for purchasing or otherwise acquiring data for playback, and device 416 a user interface for making the purchase or acquisition. It will be appreciated that remote machines 414, 416 may be configured like machine 400, and therefore include many or all of its elements. It should also be appreciated that machines 400, 414, 416 may be embodied within a single device, or separate communicatively-coupled components.

Having described and illustrated the principles of the invention with reference to illustrated embodiments, it will be recognized that the illustrated embodiments can be modified in arrangement and detail without departing from such principles. And, even though the foregoing discussion has focused on particular embodiments, it is understood other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments, and unless indicated otherwise, embodiments are combinable into other embodiments.

Consequently, in view of the wide variety of permutations to the above-described embodiments, the detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for controlling media playback, comprising:
reading data corresponding to audio and/or visual data from a destructive-read memory;
determining whether a playback device is authorized to subsequently access the read audio and/or visual data; and
if, and only if, the playback device is authorized for subsequent access, writing back the read audio and/or visual data to the destructive-read memory.

2. The method of claim 1, wherein writing back the read audio and/or visual data occurs contemporaneous with the audio and/or visual data being read from the destructive-read memory, the method further comprising:
determining said authorization based at least in part on access control data; and
writing a new access control data in a second destructive read memory based at least in part on the authorization.

3. The method of claim 1, wherein writing back the read audio and/or visual data occurs after at least a portion of the audio and/or visual data is read from the destructive-read memory.

4. The method of claim 1, further comprising:
decrementing a usage counter after the reading data;
determining the authorization based at least in part on the usage counter; and
storing access control data in a second destructive read memory determined based at least in part on the usage counter.

5. The method of claim 4, further comprising:
purchasing a commercial product having an associated usage allowance; and
setting the usage counter based at least in part on the usage allowance.

6. The method of claim 5, further comprising:
wherein one or more commercial products may be stored within the first destructive-read memory, the one or more commercial products being selected ones of a video recording, an audio recording, a music recording, directives for a device, instructions for a processor, a computer application program, a cryptographic key, and an identity identifier.

7. The method of claim 1, further comprising:
storing in the destructive-read memory selected ones of video data, audio data, music data, directives for a device, instructions for a processor, a computer application program, a cryptographic key, and an identity identifier.

8. The method of claim 1, further comprising:
storing a product in the destructive-read memory in an unprotected format.

9. The method of claim 1, further comprising:
storing a limited-use commercial product in the destructive-read memory in an unprotected format.

10. The method of claim 1, further comprising:
downloading the audio and/or visual data, access rights for the audio and/or visual data, and a description of the audio and/or visual data;
storing the audio and/or visual data in the destructive-read memory;
validating the downloaded description of the audio and/or visual data against a local policy; and
performing the authorization to subsequently access with respect to the downloaded access rights for the audio and/or visual data.

11. The method of claim 1, further comprising:
determining authorization to write-enable the destructive-read memory.

12. An article of manufacture comprising a machine-accessible storage medium having instructions for controlling media playback that, when executed, results in a machine having a processor:
reading data corresponding to audio and/or visual data from a destructive-read memory;
determining whether a playback device is authorized to subsequently access the read audio and/or visual data; and
if, and only if, the playback device is authorized for subsequent access, writing back the read audio and/or visual data to the destructive-read memory.

13. The article of manufacture of claim 12, wherein the instructions that cause the machine to write back the read audio and/or visual data occurs contemporaneous with the audio and/or visual data being read from the destructive-read memory, further includes instructions that, when executed, results in the machine performing:
determining said authorization based at least in part on access control data; and
writing a new access control data in a second destructive read memory based at least in part on the authorization.

14. The article of manufacture of claim 12, wherein the instructions that cause the machine to write back the read audio and/or visual data occurs after at least a portion of the audio and/or visual data is read from the destructive-read memory.

15. The article of manufacture of claim 12 wherein the machine-accessible media further includes instructions that, when executed, results in the machine performing:
decrementing a usage counter after the reading data;
determining the authorization based at least in part on the usage counter; and
storing access control data in a second destructive read memory determined based at least in part on the usage counter.

16. The article of manufacture of claim 15 wherein the machine-accessible media further includes instructions that, when executed, results in the machine performing:
purchasing a commercial product having an associated usage allowance; and
setting the usage counter based at least in part on the usage allowance.

17. The article of manufacture of claim 16, wherein one or more commercial products may be stored within the second destructive-read memory, the one or more commercial products being selected ones of a video recording, an audio recording, a music recording, directives for a device, instructions for a processor, a computer application program, a cryptographic key, and an identity identifier.

18. The article of manufacture of claim 12 wherein the machine-accessible media further includes instructions that, when executed, results in the machine performing:
storing in the destructive-read memory selected ones of a video recording, an audio recording, a music recording, directives for a device, instructions for a processor, a computer application program, a cryptographic key, and an identity identifier.

19. The article of manufacture of claim 12 wherein the machine-accessible media further includes instructions that, when executed, results in the machine performing:
storing a product in the destructive-read memory in an unprotected format.

20. The article of manufacture of claim 12 wherein the machine-accessible media further includes instructions that, when executed, results in the machine performing:
storing a limited-use commercial product in the destructive-read memory in an unprotected format.

21. The article of manufacture of claim 12 wherein the machine-accessible media further includes instructions that, when executed, results in the machine performing:
downloading the audio and/or visual data, access rights for the audio and/or visual data, and a description of the audio and/or visual data;
storing the audio and/or visual data in the destructive-read memory;
validating the downloaded description of the audio and/or visual data a local policy; and
performing the authorization to subsequently access with respect to the downloaded access rights for the audio and/or visual data.

22. The article of manufacture of claim 12 wherein the machine-accessible media further includes instructions that, when executed, results in the machine performing:
determining authorization to write-enable the destructive-read memory.

* * * * *